US007017057B2

(12) United States Patent
Magee et al.

(10) Patent No.: US 7,017,057 B2
(45) Date of Patent: Mar. 21, 2006

(54) PROXIMITY BASED METHOD AND APPARATUS FOR REDUCING ELECTRICAL ENERGY CONSUMED BY A PERSONAL COMPUTER WITH A SLEEP MODE

(75) Inventors: Timothy David Magee, Lexington, KY (US); Rohit R. Sahasrabudhe, Louisville, KY (US)

(73) Assignee: Lenovo (Singapore) PTE. LTD., Singapore (SG)

( * ) Notice: Subject to any disclaimer, the term of this patent is extended or adjusted under 35 U.S.C. 154(b) by 598 days.

(21) Appl. No.: 09/951,098

(22) Filed: Sep. 12, 2001

(65) Prior Publication Data

US 2003/0051181 A1 Mar. 13, 2003

(51) Int. Cl.
*G06F 1/32* (2006.01)

(52) U.S. Cl. .................. 713/320; 713/300; 455/404.2; 455/456.1

(58) Field of Classification Search ................ 713/168, 713/300, 320, 324; 345/212
See application file for complete search history.

(56) References Cited

U.S. PATENT DOCUMENTS 5,629,981 A * 5/1997 Nerlikar ..................... 713/168
5,721,935 A 2/1998 DeSchepper et al. ....... 395/750
5,745,850 A * 4/1998 Aldermeshian et al. ..... 455/417
5,987,613 A 11/1999 Busch et al. ................ 713/300
6,016,548 A 1/2000 Nakamura et al. .......... 713/323
6,167,261 A * 12/2000 Amin ...................... 455/426.1
6,259,486 B1 7/2001 Mahvi ........................ 348/553
6,268,845 B1 7/2001 Pariza et al. ................ 345/112
6,282,655 B1 * 8/2001 Given ........................ 713/200
6,650,322 B1 * 11/2003 Dai et al. ................... 345/212
6,823,189 B1 * 11/2004 Akhteruzzaman et al. ....................... 455/456.1

OTHER PUBLICATIONS

Tanenbaum Andrew S., Computer Networks, 1996, Prentice-Hall Inc, Third Edition, p. 328.*

* cited by examiner

*Primary Examiner*—Thomas Lee
*Assistant Examiner*—Mark Connolly
(74) *Attorney, Agent, or Firm*—Scott W. Reid; John L. Rogitz

(57) ABSTRACT

A personal computer that enters sleep mode to conserve electrical energy is responsive to a proximity detector and a proximity timer. As long as a user is near the computer, as determined by the proximity detector, the computer is controlled by an activity timer, and enters sleep mode upon being idle for a predetermined period of time. When the proximity detector determines that the user has left the computer unattended, the proximity detector starts the proximity timer. When the proximity timer expires, the computer enters sleep mode. Because the proximity timer operates only when the user has left the computer unattended, the proximity timer may be set to expire earlier than the activity timer. Consequently, the computer may enter sleep mode earlier than would otherwise be possible, and thereby consumes less energy.

12 Claims, 4 Drawing Sheets

PROXIMITY BASED METHOD AND APPARATUS FOR REDUCING ELECTRICAL ENERGY CONSUMED BY A PERSONAL COMPUTER WITH A SLEEP MODE

FIELD OF THE INVENTION

The present invention is related to the field of personal computers, and more specifically to a method and apparatus for reducing the electrical energy consumed by an unattended personal computer.

BACKGROUND

Personal computers have become so widely accepted that they now constitute a significant draw on the national power grid. For example, the computers in a large office building may consume more energy than the building's heating or lighting systems. As a result, attention has been directed toward improving personal computers so that they consume less energy. For example, a personal computer may have a reduced-power mode often called a "sleep mode."

When the computer is idle for a predetermined period of time, as indicated by a control signal generated in the absence of activity from its keyboard, mouse, or other input device, the computer enters the sleep mode. When a user subsequently interacts with the computer, for example by moving the mouse, the computer awakens from the sleep mode and returns to its normal, full-power state of operation. Sleep mode is described in more detail in the following U.S. Pat. No. 6,268,845 to Pariza; U.S. Pat. No. 6,016,548 to Nakamura; U.S. Pat. No. 5,987,613 to Busch; and U.S. Pat. No. 5,721,935 to DeSchepper.

The need to awaken a personal computer from sleep mode can be an inconvenience to the user of the computer, as the computer may take a relatively long time to make the transition from asleep to awake. This can be especially annoying when the computer enters sleep mode when the user pauses only briefly for thought or conversation.

Consequently, a user of a personal computer often configures the personal computer to enter sleep mode only after it has been idle for a considerable time. For example, a personal computer may routinely continue to operate in full-power mode for twenty minutes or more after the user has left the office and therefore left the computer unattended. Thus, the desire for convenience may at times be fundamentally at odds with the need to conserve energy.

Battery powered personal computers, such as laptop computers, personal digital assistants, electronic notebooks, and the like may also have sleep modes. The purpose of having a sleep mode in a battery-powered device is to delay for as long as possible the need to recharge or replace the device's battery. Nevertheless, the same conflict between conservation and convenience applies also to personal computers that are powered by batteries, as battery-powered devices should enter sleep mode at the earliest convenient opportunity, in order to conserve battery life, and yet not inconvenience the user by entering sleep mode at an inopportune time.

As a result of the fundamental conflict between the desire to conserve energy and the desire not to inconvenience the user of a personal computer, there is a need to improve the operation of sleep mode for personal computers, so that a computer may enter sleep mode at the earliest convenient moment, and yet not needlessly inconvenience its user.

SUMMARY

The present invention improves the operation of a personal computer that has a sleep mode, by enabling the computer to enter the sleep mode at the earliest convenient time once it is left unattended by its user. The sleep mode may be a full state sleep mode as described in the aforementioned U.S. Pat. No. 6,268,845 to Pariza; U.S. Pat. No. 6,016,548 to Nakamura; U.S. Pat. No. 5,987,613 to Busch; and U.S. Pat. No. 5,721,935 to DeSchepper; or may be a new sleep mode according to the present invention wherein selected individual components of the computer enter a power-saving sleep mode but the computer otherwise stays in a full-power state. This kind of sleep mode is called here "component sleep mode." For example, a display may enter component sleep mode, wherein the display sleeps but the other components of the computer continue in full-power mode. This is called here a "display sleep mode." Other component sleep modes may be defined accordingly for other components. For example, part of a CPU may enter a sleep mode, which may be called processor sleep mode. As a convenience, however, the general term "sleep mode" is used herein to encompass full state sleep mode, component sleep mode, display sleep mode, processor sleep mode, and other component sleep modes that may be defined for other components.

A personal computer improved by the present invention includes a proximity detector, a proximity timer, an activity detector, and an activity timer. As long as the user is near the personal computer, as determined by the proximity detector, the computer may be controlled by the activity detector and activity timer, which put the computer into sleep mode after the computer has been idle for a predetermined period of time. When the proximity detector determines that the user is away from the computer and therefore has left the computer unattended, the proximity detector starts the proximity timer. Upon expiration of the proximity timer, the computer is put into sleep mode. Because the proximity timer operates only when the user has left the computer unattended, the proximity timer may be set to expire well ahead of the activity timer. As a result, the computer may enter the sleep mode at the earliest convenient time when left unattended, and thereby consume less electrical energy, and yet not inconvenience a user who remains with the computer but pauses midstream to think.

These and other aspects of the present invention will be more fully appreciated when considered in the light of the following detailed description and drawings.

DETAILED DESCRIPTION OF THE INVENTION

The present invention conserves electrical energy by putting a personal computer into a power-reduced sleep mode when a proximity detector determines that the computer has been left unattended.

Figure 1:
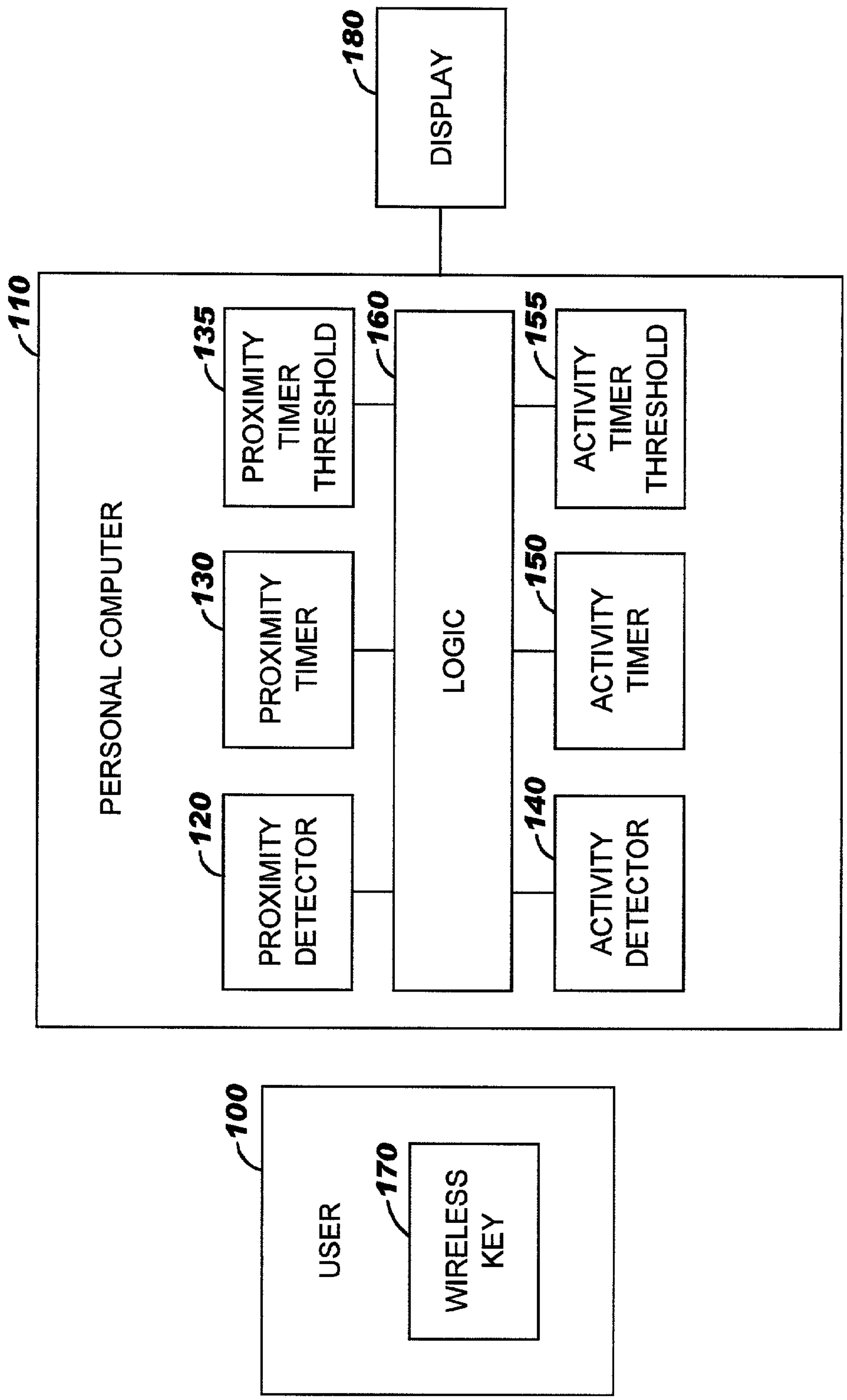
FIG. 1 is a block diagram showing a personal computer that includes proximity detector, a proximity timer, a proximity timer threshold, an activity detector, an activity timer, an activity timer threshold, controlling logic, and a wireless key carried by a user of the personal computer.

FIG. 1 shows aspects of the structure of an exemplary embodiment of the present invention. In FIG. 1 there is a personal computer 110, which may be powered by the electric mains or which may be powered by a battery. The personal computer 110 may be a traditional desk-top personal computer, a laptop computer, an Internet appliance, a specialized workstation, a personal digital assistant, an electronic organizer or notebook, a server and the like.

As shown in FIG. 1, the personal computer 110 includes a proximity detector 120, a proximity timer 130, a proximity timer threshold 135, an activity detector 140, an activity timer 150, an activity timer threshold 155, and logic 160 for controlling the operation of the proximity detector 120, proximity timer 130, proximity timer threshold 135, activity detector 140, activity timer 150, and activity timer threshold 155. The personal computer 110 may also include a display 180, which may be any kind of display or monitor suitable for use with the personal computer 110, such as a cathode-ray-tube display, a flat panel LCD display, a plasma display, and the like.

The proximity detector 120 determines whether a user 100 of the personal computer 110 is near the personal computer 110 or away from the personal computer 110. When describing the present invention, the term "near" means that the user 100 is sufficiently close to the personal computer 110 to be reasonably presumed to be able to operate the personal computer 110 conveniently, for example the user 100 is within an office, cubicle, or room that also contains the personal computer 110, or within a distance of roughly ten feet of the personal computer 110. When the user 100 is not near the personal computer 110, the user is "away" from the personal computer 110, and the personal computer 110 is "unattended."

As shown in FIG. 1, the user 100 carries or otherwise has immediate possession of a wireless key 170. According to various embodiments of the invention, the wireless key 170 may include a key receiver component, a key transmitter component that emits a limited-range electromagnetic signal, a key transceiver component, which may operate according to the Bluetooth standard or which may include a passive transponder that delays and returns an electromagnetic signal emitted by the proximity detector 120, or any combination or subset of these components.

The transmitter component of the wireless key 170 may emit the limited-range electromagnetic signal continuously, intermittently, or in response to a poll or prompt. The limited-range electromagnetic signal may be unmodulated, or the limited-range electromagnetic signal may be modulated to carry intelligence that bears a serial number or other attribute that identifies a particular user 100 who is presumed to have possession of the wireless key 170. Range of the electromagnetic signal may be controlled by limiting the power of the key transmitter component, or by limiting the sensitivity of a receiver that receives the limited-range electromagnetic signal.

In one embodiment of the invention, the proximity detector 120 includes a receiver component that is responsive to the limited-range electromagnetic signal emitted by the wireless key 170. When the receiver component of the proximity detector 120 fails to detect the limited-range electromagnetic signal emitted by the wireless key 170, the proximity detector 120 concludes that the user 100 is away from the personal computer 110. In this embodiment, the wireless key 170 may include a transmitter component and lack a receiver component.

In another embodiment of the invention, the proximity detector 120 includes a polling transceiver that polls the wireless key 170. When the user 100 is near the personal computer 110, the wireless key 170 carried by the user 100 detects the poll by the proximity detector 120 and responds thereto, and the proximity detector 120 detects the response from the wireless key 170. When the user 100 is away from the personal computer 110, the wireless key 170 carried by the user 100 fails to detect the poll and consequently fails to respond thereto, or the proximity detector 120 fails to detect the response by the wireless key 170.

Figure 2:
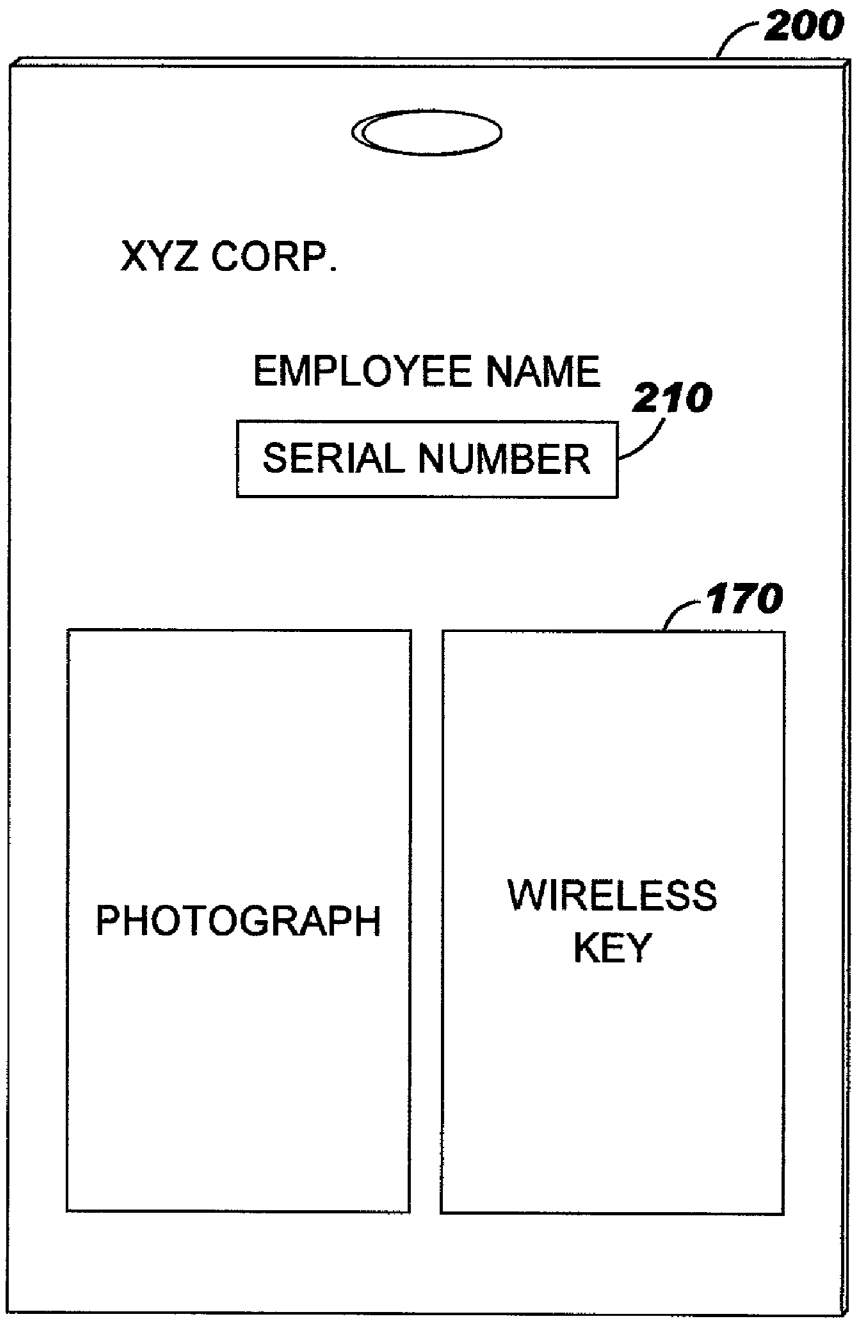
FIG. 2 shows the wireless key of FIG. 1 attached to a security badge that identifies the user.

In another embodiment of the invention, the wireless key 170 is included in an identification badge 200 of the type assigned to an employee, with the expectation that the employee will wear the identification badge 200 when using the personal computer 110. An exemplary structure of this embodiment is shown in FIG. 2. According to this embodiment, the limited range electromagnetic signal emitted by the wireless key 170 may be modulated to convey a serial number 210 that is associated with the badge 200 and thereby associated with the user 100. The proximity detector 120 may determine whether the user 100 is near the personal computer 100 by taking into account not only detection of an electromagnetic signal emitted by the wireless key 170, but also reception of the particular serial number 210. Thus the proximity detector may discriminate between any user with a wireless key and a particular user 100 with a particular wireless key 170.

When the wireless key 170 is included in an identification badge 200 and powered by a battery, power from the battery to the wireless key 170 may be switched on when the user 100 presents the identification badge 200 to a security system in order to enter a secure facility. Power may be switched off according to a timer (for example, nine hours after it is switched on) or when the user 100 presents the identification badge 200 to the security system in order to leave the secure facility.

In yet another embodiment of the invention, the wireless key 170 may be included in a cellular telephone or similar wireless communication device such as a personal digital assistant (PDA) carried by the user 100. Here, the term "cellular telephone" is used as a convenience to describe all such personal devices equipped for wireless communication. In this embodiment, the proximity detector 120 detects electromagnetic signals emitted by the cellular telephone that includes the wireless key 170. These signals may be coincidental to the operation of the proximity detector 120, for example the periodic transmission of registration messages that identify the cellular telephone to a base station, or the signals may be emitted specifically for use by the proximity detector 120, for example messages that are transmitted by a Bluetooth transceiver included in the cellular telephone. When the proximity detector 120 detects such signals, the user 100 is judged to be near the personal computer 110. When the proximity detector 120 does not detect such signals, the user 100 is judged to be away from the personal computer 110.

As shown in FIG. 1 and mentioned above, the personal computer 110 may also include a proximity timer 130, a proximity timer threshold 135, an activity detector 140, an activity timer 150, and an activity timer threshold 155. As explained below, the proximity timer 130 may be started when the proximity detector 120 determines that the user 100 is away from the personal computer 110. The proximity timer threshold 135 specifies a particular value for the proximity timer 130. When the proximity timer 130 reaches the proximity timer threshold 135, which threshold may have an exemplary value of one minute, the personal computer 110 is consequently put into sleep mode. The logic 160 may compare the value of the proximity counter 130 to the value of the proximity counter threshold 135, and generate a control signal or proximity signal when the value of the proximity counter 130 exceeds the value of the proximity counter threshold 135.

The activity detector 140 monitors inputs to the personal computer 110 to determine when the personal computer 110 is active or idle. For example, the activity detector 140 may monitor keyboard or mouse activity. As explained below, the activity timer 150 may be started when the activity detector 140 determines that the personal computer 110 is idle (although not necessarily unattended). The activity timer threshold 155 specifies a particular value for the activity timer 150. When the activity timer 150 reaches the activity timer threshold 155, the personal computer 110 is consequently put into sleep mode.

Operations of the proximity detector 120, the proximity timer 130, the proximity timer threshold 135, the activity detector 140, the activity timer 150, and the activity timer threshold 155 are controlled by the logic 160. The logic 160 may include instructions executed by a programmable processor, which processor may also be used for other purposes by the personal computer 110. Although FIG. 1 shows the proximity detector 120, the proximity timer 130, the proximity timer threshold 135, the activity detector 140, the activity timer 150, and the activity timer threshold 155 as elements separate from the logic 160 for descriptive convenience, these elements in whole or in part may be included within the logic 160.

Figure 3:
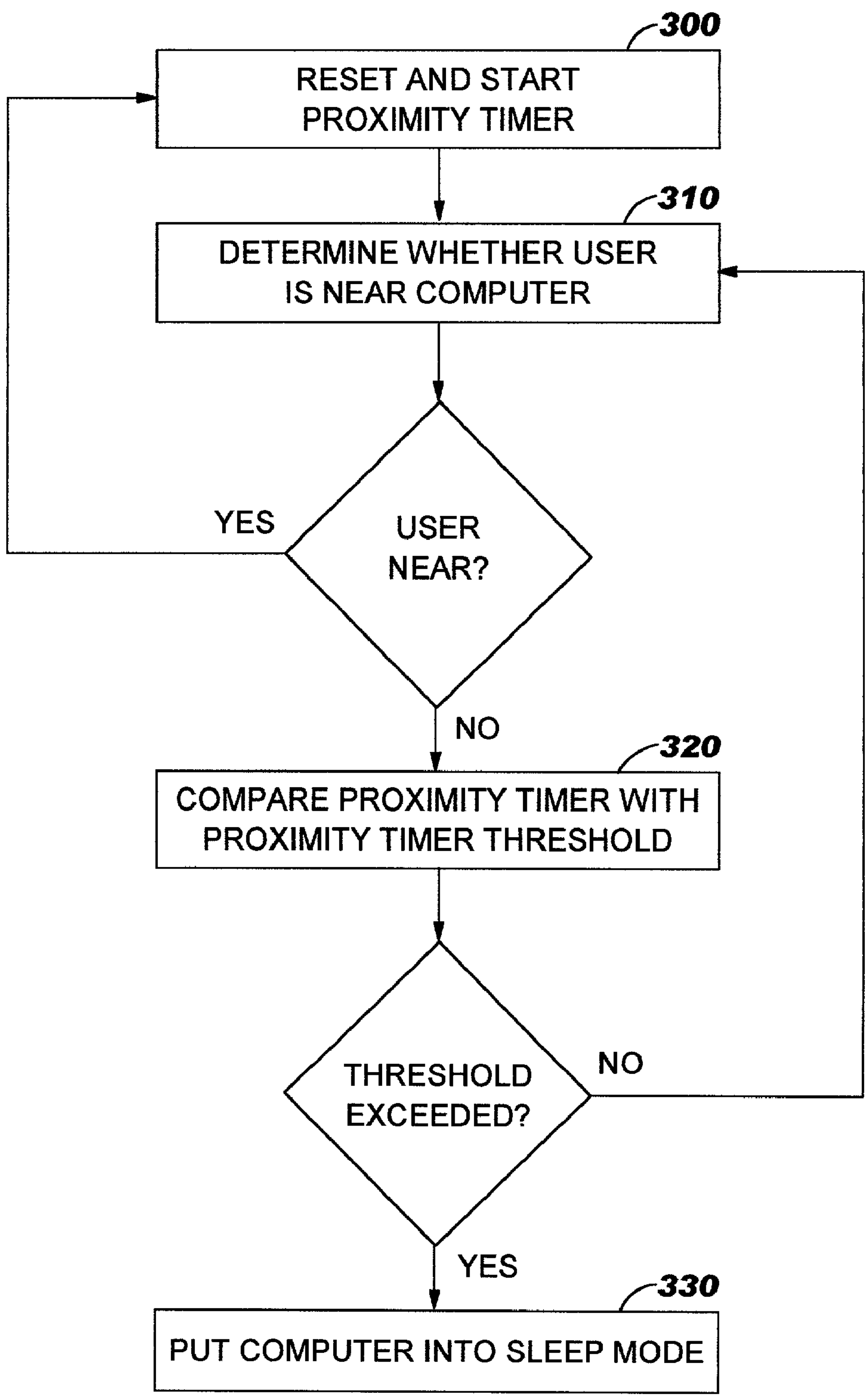
FIG. 3 is a flowchart that shows aspects of the operation of the logic of FIG. 1 according to the present invention.

FIG. 3 is a flowchart that shows aspects of the operation of the logic 160 according to the present invention. To initialize the operation, the proximity timer 130 is reset to zero and started (step 300). The proximity detector 120 determines whether the user 100 is near the personal computer 110 or away (step 310). When the user 100 is determined to be near the personal computer 110, the proximity timer 130 is reset to zero, and the process is begun again (step 300). Otherwise, (i.e., the user 100 is away from the personal computer 110), the value of the proximity timer 130 is compared with the value of the proximity timer threshold 135 (step 320). If the value of the proximity timer 130 exceeds the value of the proximity timer threshold 135, the personal computer 110 is put into sleep mode (step 330). Otherwise (i.e., the value of the proximity timer 130 does not exceed the value of the proximity timer threshold 135), the process returns to the point where the proximity detector 120 determines whether the user 100 is near the personal computer 110 (step 310), and the process continues as just described.

The sleep mode may be a full-state sleep mode as described in the aforementioned U.S. Pat. No. 6,268,845 to Pariza; U.S. Pat. No. 6,016,548 to Nakamura; U.S. Pat. No. 5,987,613 to Busch; and U.S. Pat. No. 5,721,935 to DeSchepper; or may be a new sleep mode according to the present invention wherein selected individual components of the computer 110 enter a power-saving state but the computer 110 otherwise stays in a full-power state. This kind of sleep mode is called here "component sleep mode." For example, the display 180 may enter component sleep mode, wherein the display 180 sleeps but the other components of the computer 110 continue in full-power mode. This is called here a "display sleep mode." Other component sleep modes may be defined accordingly for other components. For example, part of the CPU or logic 160 may enter a sleep mode, which may be called processor sleep mode. As a convenience, however, the general term "sleep mode" is used to encompass full-state sleep mode, component sleep mode, display sleep mode, processor sleep mode, and other component sleep modes that may be defined for other components. The personal computer 110 may be configured to provide a particular kind of sleep mode, or may enable the user 100 to choose a particular kind of sleep mode by selecting an option from a list of available sleep modes. For example, the user 100 may be shown a list that includes full state sleep mode, display sleep mode, and processor sleep mode, from which he or she would choose.

Figure 4:
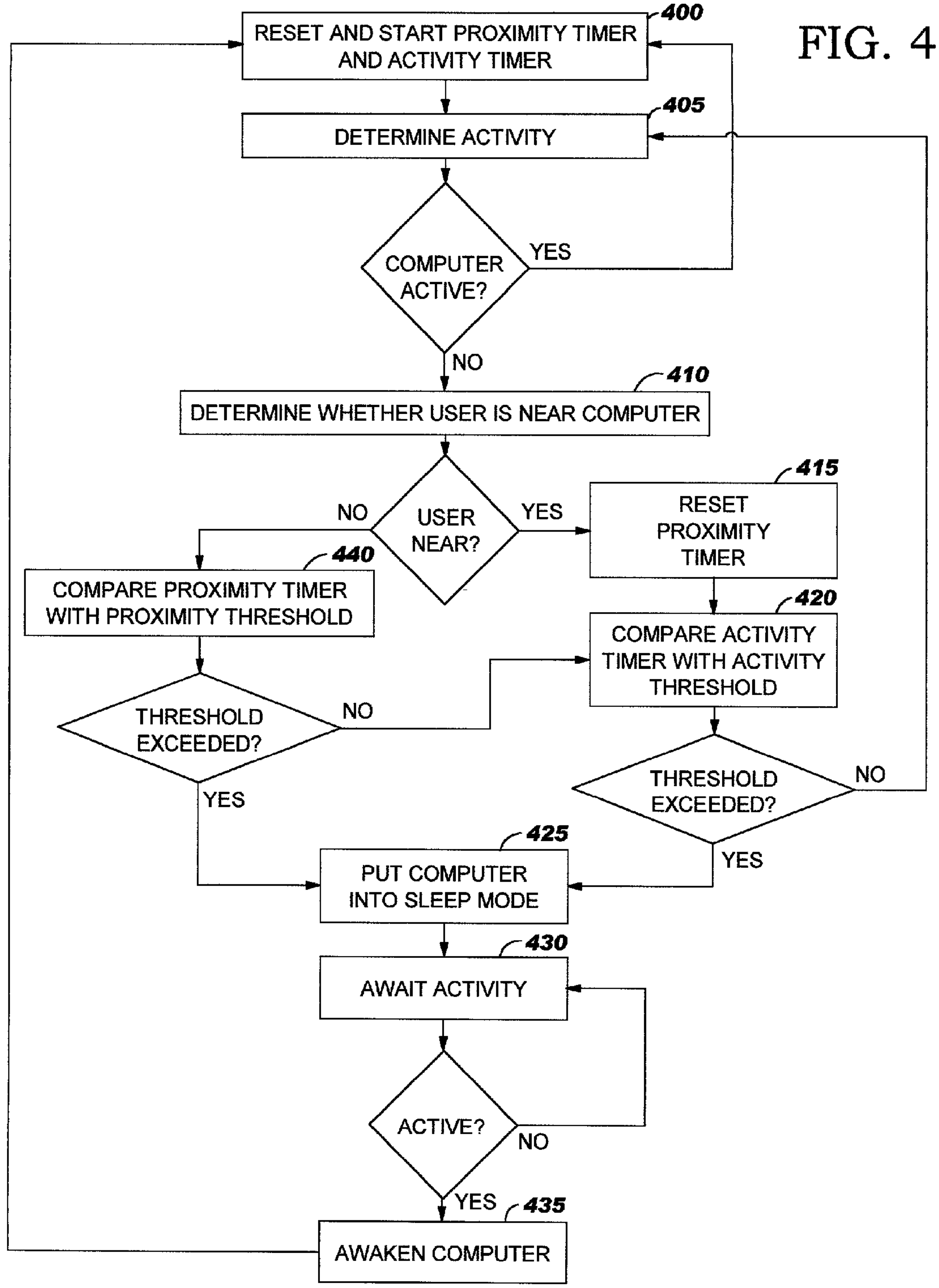
FIG. 4 is a flowchart that shows further aspects of the operation of the logic of FIG. 1 according to the present invention.

FIG. 4 is a flowchart that shows further aspects of the operation of the logic 160 according to the present invention. To initialize the operation, the proximity timer 130 and the activity timer 150 are reset to zero and started (step 400). The activity detector 140 determines whether the personal computer 110 is active (more precisely, has been active since the last check for activity) (step 405). If the personal computer 110 is active, the process returns to the point where the proximity timer 130 and the activity timer 150 are reset to zero and restarted (step 400), and the process continues as just described.

Otherwise (i.e., the personal computer 110 is idle), the proximity detector 120 determines whether the user 100 is near the personal computer 110 or away (step 410). If the user 100 is near the personal computer 110, the proximity timer 130 is reset (step 415), and the value of the activity timer 150 is compared with the value of the activity timer threshold 155 (step 420).

If the value of the activity timer 150 does not exceed the value of the activity timer threshold 155, the process returns to the point where the activity detector 140 determines whether the personal computer 110 is active (step 405), and continues as described above. If the value of the activity timer 150 exceeds the value of the activity timer threshold 155, the personal computer 110 is put into sleep mode (step 425).

While the personal computer 110 is in sleep mode, the activity detector 140 awaits activity (step 430). Activity may be detected when the user 100 manipulates an input of the personal computer 110, or when the user 100 momentarily closes a switch that has the specific purpose of awakening the personal computer 110 from sleep mode. When activity is detected, the personal computer 110 awakens from sleep mode (step 435). The process then returns to the point where the proximity timer 130 and the activity timer 150 are reset to zero and started (step 400), and continues as described above.

Otherwise (i.e., the personal computer 110 is idle and the user 100 is away from the personal computer 110, which is the negative branch following step 410 of FIG. 4), the value of the proximity timer 130 is compared with the value of the proximity timer threshold 135 (step 440). If the value of the proximity timer 130 does not exceed the value of the proximity timer threshold 135, the process returns to the point where the value of the activity timer 150 is compared with the value of the activity timer threshold 155 (step 420), and continues from this point as described above. If the value of the proximity timer 130 exceeds the value of the proximity timer threshold 135, the personal computer 110 is put into the sleep mode (step 425), and the process continues from this point as described above.

From the foregoing description, those skilled in the art will recognize that the present invention conserves electrical energy be enabling a personal computer to enter a sleep mode at the earliest convenient moment once the computer is left unattended. The foregoing description is illustrative rather than limiting, however, and the present invention is limited only by the following claims.

We claim:

1. Apparatus for reducing electrical energy consumption, the apparatus comprising:

a personal computer that enters a sleep mode responsive to a control signal;

a proximity detector of transmitted registration messages emitted by a nearby wireless telephone, the registration messages identifying the wireless telephone to a wireless telephony system base station; and logic for generating the control signal when the proximity detector bus to detect the transmitted registration messages from the nearby wireless telephone.

2. Apparatus for reducing electrical energy consumption, the apparatus comprising:

a personal computer that enters a sleep mode responsive to a control signal;

a proximity detector of transmitted messages emitted by a nearby wireless key in response to at least one polling signal; and logic for starting a proximity timer responsive to the proximity detector, comparing a value of the proximity timer to a value of a proximity timer threshold, and generating the control signal when the value of the proximity timer exceeds the value of the proximity timer threshold.

3. The apparatus of claim 2, wherein the sleep mode is a full state sleep mode.

4. The apparatus of claim 2, wherein the sleep mode is a component sleep mode.

5. The apparatus of claim 2, wherein the sleep mode is a display sleep mode.

6. The apparatus of claim 2, wherein the sleep mode is a processor sleep mode.

7. A method of conserving electrical energy, comprising the steps of:

determining, by a proximity detector of transmitted registration messages emitted by a cellular telephone, whether the cellular telephone is nearby a personal computer; and putting the personal computer into a sleep mode when the cellular telephone is determined to be away from the personal computer.

8. A method of conserving electrical energy, comprising:

determining, by a proximity detector of at least one transmitted wireless signal emitted by a wireless key, whether the wireless key is away from a personal computer; and putting the personal computer into a sleep mode at least partially based on the wireless signal, wherein the wireless signal is transmitted in response to at least one wireless signal generation strategy selected from the group of strategies consisting of; generating at least one wireless signal in response to at least one polling signal, and intermittently generating at least one wireless signal.

9. The method of claim 8, wherein the sleep mode is a full state sleep mode.

10. The method of claim 8, wherein the sleep mode is a component sleep mode.

11. The method of claim 8, wherein the sleep mode is a display sleep mode.

12. The method of claim 8, wherein the sleep mode is a processor sleep mode.

* * * * *